United States Patent [19]
Rutz

[11] 4,357,202
[45] Nov. 2, 1982

[54] REFRACTORY OXIDE FABRICATION

[75] Inventor: Richard F. Rutz, Cold Spring, N.Y.

[73] Assignee: International Business Machines Corporation, Armonk, N.Y.

[21] Appl. No.: 273,272

[22] Filed: Jun. 12, 1981

[51] Int. Cl.³ .................... B44C 1/22; C03C 15/00; C03C 25/06; C23F 1/02
[52] U.S. Cl. .................................. 156/635; 156/644; 156/646; 156/654; 156/657; 156/667
[58] Field of Search ............. 156/628, 635, 646, 650, 156/656, 657, 659.1, 644, 667, 638, 654, 655

[56] References Cited

U.S. PATENT DOCUMENTS

| | | | |
|---|---|---|---|
| 4,008,111 | 2/1977 | Rutz | 156/656 |
| 4,038,117 | 7/1977 | Noble et al. | 156/646 |
| 4,098,917 | 7/1978 | Bullock et al. | 427/36 |

OTHER PUBLICATIONS

IBM Technical Disclosure Bulletin, vol. 18, No. 12, May 1976, Selective Etching of Sapphire by R. F. Rutz, pp. 4185–4186.
Dushman–Vacuum Technology, 4th Edition, pp. 765–767.
Journal of Electrochemical Society, vol. 126, No. 6, Jun. 1979, pp. 1004–1008.

*Primary Examiner*—William A. Powell
*Attorney, Agent, or Firm*—Alvin J. Riddles

[57] ABSTRACT

Refractory oxide materials, for example, $Al_2O_3$ (sapphire) and $Al_2MgO_4$ (spinel) can be shaped to precise dimensions by using a preformed member having a higher melting temperature than the oxide in the outline of the desired shape placed in contact with the refractory oxide and subjecting the combination to a temperature between 1500° C. and the melting temperature of the oxide in the presence of a forming gas atmosphere containing an inert gas and approximately 15% hydrogen. The refractory oxide is etched over the area of contact.

5 Claims, 4 Drawing Figures

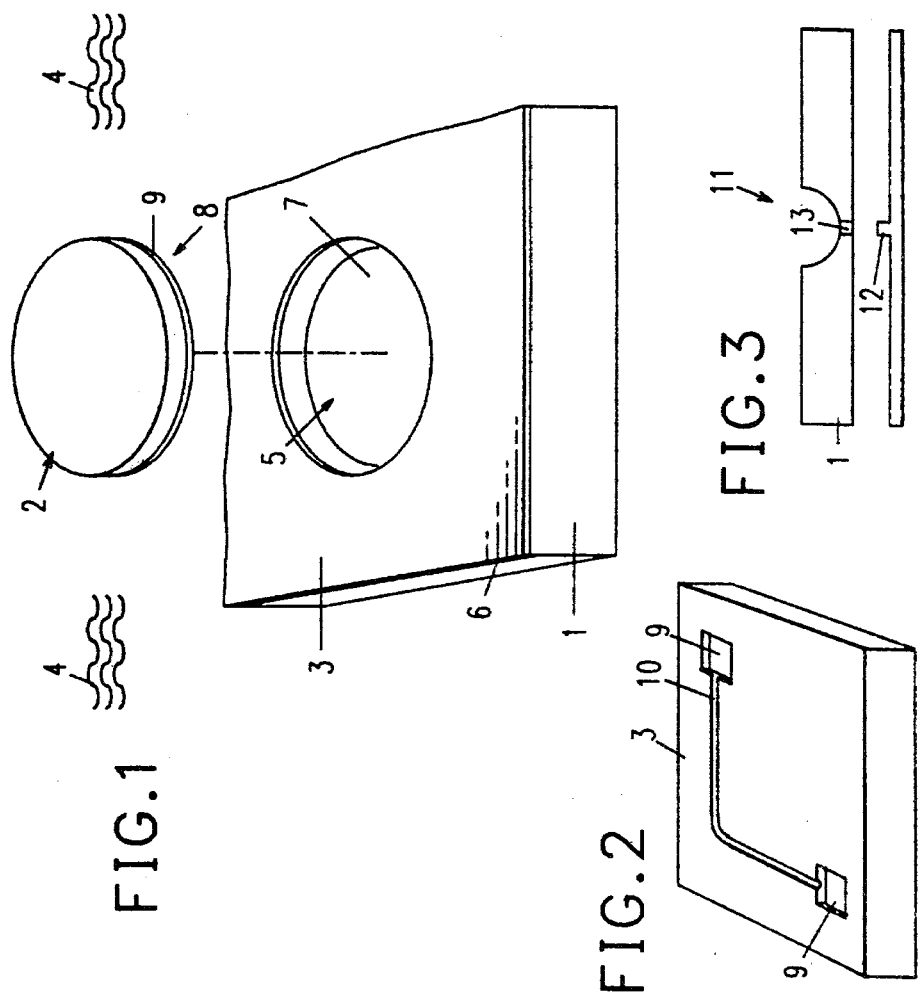

REFRACTORY OXIDE FABRICATION

DESCRIPTION

Technical Field

The technical field of the invention is the fabrication of precise shapes using materials that have useful properties such as hardness, resistance to wear and electrical resistance but which are very difficult to fabricate with conventional shaping techniques such as machining. Among such materials are the refractory oxides aluminum oxide known as sapphire and magnesium-aluminum oxide known as spinel.

BACKGROUND ART

The sapphire and spinel type materials have been roughly shaped and holes have been placed in them by etching operations. One illustration of such an operation is in U.S. Pat. No. 4,008,111. However, heretofore in the art in etching, the etchant proceeds to erode the material in more than one dimension so that close control of the desired shape is not readily achievable. In ordinary machining types of operations, the tools available are not generally as hard as the materials being shaped and further the material is quite brittle resulting in jagged edges and rapid tool wear.

BRIEF DESCRIPTION OF THE DRAWINGS

FIG. 1 is a schematic illustration of the positioning of an etching shape.

FIG. 2 is an illustration of the fabrication of inclusion areas and grooves.

FIG. 3 is an illustration of the formation of a precisely dimensioned and located hole.

FIG. 4 is an illustration of the fabrication of an embossed structure.

DISCLOSURE OF THE INVENTION

The refractory oxides of the spinel and sapphire type are precisely etched over the area of contact of a preformed shape member placed in contact with the surface of the refractory oxide in the presence of a hydrogen bearing gas at a temperature above 1500° C. and below the melting temperature of both the refractory oxide and the preformed shape member.

Referring to FIG. 1, a schematic illustration is provided of the operations and materials involved. In FIG. 1, the substrate 1 is a refractory oxide such as $Al_2O_3$, $SiO_2$, MgO or $Al_2MgO_4$. A preformed shape of a member 2 is placed in contact with the surface 3 of the substrate 1. The member 2 should have the properties that it can be readily machinable or otherwise shapeable and it should also have a melting temperature above 1500° C. but below that of the refractory oxide substrate 1. The metals titanium, tungsten, zirconium, and hafnium, and alloys thereof, have satisfactory properties for use with refractory oxides. As the dimensions involved become so small as to be within the grain size of the materials used for the preformed shape member 2, the grain size of the material should be taken into consideration since the etching rate is slightly orientation dependent. The roughness of the edge definition of an etched hole will be determined in part by the size and shape of metal grains which can be made as small as 1000Å by well known metallurgical preparation methods. Where the preform shape 2 is of single crystal material, there will be no need for grain size consideration.

In FIG. 1, the shaped member 2 for illustration is shown as a round disk. The member 2 is made of a material with a melting temperature in excess of 1500° C. but less than the melting temperature of the substrate 1 and which has the properties such that it can be readily machined or otherwise fabricated to the dimensions required.

A gas 4 which promotes the etching action is employed surrounding at least the region of contact of the substrate 1 and the member 2. The gas 4 is made up of a carrier gas, such as argon, containing about 15% hydrogen. The relative proportions of the ingredients of the gas 4 may be varied. The 85% value for the inert gas is governed by convenience and safety considerations. Such gasses as argon, helium and neon are satisfactory inert gasses. The elements carbon and nitrogen should be eliminated since these form deposits that inhibit etching.

The temperature is raised to between 1500° C. and the melting temperature of the substrate 1. Under these conditions, the surface 3 of the substrate 1 is etched away in the precise area of contact of the shape of the member 2. The schematic of FIG. 1 for clarity illustrates the situation after an opening 5 has been etched out of the surface 3 of the substrate 1. The schematic of FIG. 1 shows the member 2 having been withdrawn along the dotted line.

The edge of the opening 5 follows to close precision the edge configuration of the preformed shape member 2. The sharpness of the edge configuration of the opening 5 may be further enhanced through the application of a coating 6 of an oxide of the material of the preformed shape member 2 on the surface of the substrate 1. The depth of the material removed by etching as illustrated by the opening 5 is roughly proportional to time. As the etching proceeds, the reaction occurs primarily at the interface of the preform shape 2 and the substrate 1 during the etching operation. In FIG. 1, which is a view after the etching has taken place and the preform shape 2 has been moved along the dotted line, the interface during the etching would have been the area of contact of the bottom surface 7 of the opening 5 and the lower surface 8 of the preformed member 2. Some reaction also takes place along the vertical sidewalls of the opening 5 making the opening slightly larger than the original preform member 2. This allows the preform 2 to be easily lifted from the opening 5 after the etching operation.

When the desired dimension for the depth of the opening 5 is achieved, the member 2 is withdrawn along the dotted line as shown or, if desired, is suitably removed by an etching operation responsive to the material of the member 2 but not responsive to the material of the substrate 1. The member 2 does not change dimension more than a few percent in the dimension of the plane of the surface 3. In the direction perpendicular to the plane of the surface 3, it becomes thicker as indicated by element 9 due to the addition of substrate 1 material in the etching. After the etching operation, there is a different surface finish on the portion 9 of the member 2 that was in the opening 5.

Best Mode For Carrying Out The Invention

Referring again to FIG. 1, in the preferred embodiment the substrate 1 is of aluminum oxide ($Al_2O_3$) or sapphire and the preformed shape member 2 is of titanium metal. The gas 4 is argon 85%, hydrogen 15%, and the temperature is between 1500° C. and the melting temperature of the Ti which is 1660° C., preferably 1550° C. Under these conditions, a portion 5 of the substrate 1 is etched away in the relatively precise configuration of the area of contact with the member 2. When the temperature is reduced to room temperature, the member 2 is removed by merely lifting along the dotted line leaving the substrate 1 with an etched away depression 5.

As a specific illustration to provide a starting place for the practice of the invention, where the preformed shape member 2 is 3 millimeters of an inch in diameter, made of titanium 500 micrometers thick, the depression 5 is 140 micrometers deep at the end of 17 minutes using a gas 4 of argon 85%, hydrogen 15%. At 1550° C. the depth of the depression 5 is approximately proportional to the time and the rate is 8 micrometers per minute.

While the exact physical or chemical mechanism involved in the etching has not been established, some observations have been made. It has been observed that the hydrogen in the gas plays a role. The preferred gas 4 is argon 85%, hydrogen 15% and where the ambient gas is changed to pure argon, the etching rate of removal of the substrate diminishes drastically. The material in the region 9 of the titanium member 2 after the etching operation is 59% titanium, 41% aluminum by weight. No oxygen is detected within a sensitivity of less than 0.005%. This would lead to the observation that the oxygen from the refractive oxide substrate reacts with the hydrogen in the gas and goes off as a gas leaving a TiAl solid solution. It has further been observed that the etching should preferably be done in a tungsten furnace with care to see that nitrogen and carbon are not present since these promote the formation of nitrides and carbides which inhibit the etching process.

At the end of the etching operation, when the preformed shape member 2 is removed, the bottom of the etched depression 5 tends to have a slightly uneven surface. Through removal of the hydrogen from the gas 4 and continued maintenance of the temperature in the presence of pure argon, the surface unevenness is removed.

Further precision of the edge definition of the opening 5 is assisted through the use of a thin layer 6 of titanium dioxide or the metal titanium applied, for example, by evaporation or chemical vapor deposition over the surface of the substrate 1 before the member 2 is placed in contact. This adds dimension precision in defining the edges of the opening 5, it prevents spurious etching of the substrate 1 near the perimeter of the preformed shape member 2 and it facilitates removal of the member 2 after the etching is completed. The residual oxide or metal on the surface 3 after the heating cycle of the etching process can be removed in HF plus $NHO_4$ etches and hot phosphoric acid or other suitable etches.

While for purposes of explanation the member 2 has been shown as a physical object, it will be apparent to one skilled in the art that for very thin etched dimensions, the member 2 may be evaporated or sputtered in a photoresist defined pattern with a subsequent standard etch for the particular material of the member 2 to produce intricate or detailed patterns. The material of member 2 may for this purpose be deposited in an appropriate thickness on a material other than the material of member 2 so long as the material of member 2 does not react appreciably with it at the etching temperature. A Ti pattern on sapphire itself would be such an example so long as the thickness of the Ti pattern is at least twice the thickness of the etching to take place in the substrate 1.

Referring next to FIG. 2, there is a schematic illustration of a substrate with provision for inclusions and grooves such as would be employed for integrated circuits, for devices with electrical conductors to be used under high electrical or thermal stress and for intricate designs. The typical silicon on sapphire integrated circuits are a well known example of the type of structure employing inclusions. Certain vacuum tube cathodes and grids employ conductors where grooves are appropriate in a sapphire mounting and ornamental designs require bonded intricate patterns.

In FIG. 2 for an integrated circuit example, a sapphire substrate 1 is provided and using preformed shape members 2 of titanium for each inclusion region 8 in contact with the surface 3 in the presence of an argon 85%, hydrogen 15%, forming gas above 1500° C. for a time sufficient to form the inclusion accommodating regions 9 in the surface. Dimensions of the order of 3 mils diameter, 1 mil deep in an array are achievable using a preferred shape member 2 of titanium with an array of mesas formed by masking and etching. Large area etched depressions are achievable and the limit on small dimensions is mainly grain size for polycrystalline preform shape members 2 and the limitations of photoresist technology to define the desired patterns.

The material of the inclusions is then subsequently placed in the openings 9 by either physical insertion of preformed chips of such materials as silicon or by such techniques well known in the semiconductor industry as chemical vapor growth through a mask that confines the growth to the openings 9. Subsequent to the formation of the inclusions in the deeper openings 9 but before insertion of the inclusions, shallower grooves 10 are provided for conductors from one active device inclusion 9 to another. The grooves 10 are formed using standard photolithography techniques to apply a pattern of, for example, titanium 2 onto the exposed surface 3. Heat is then applied above 1500° C. in the presence of an argon 85% hydrogen 15% forming gas. The titanium 2 is then removed with a standard etch such as the well known white etch ($HNO_3+HF$). The preform approach can also be employed to get shorter distances and shallower grooves.

Referring next to FIG. 3, an illustration is provided of the formation of a very small hole for applications in the art such as an ink jet or an optical aperture. In FIG. 3, the substrate 1 is thinned to the order of the etching operation of the invention. This is done by a conventional etching operation as is shown in U.S. Pat. No. 4,008,111 resulting in a large opening 11 with a thin web remaining. A preformed shape member 12 the size of the desired hole is provided to be positioned in contact with the substrate 1. The etching operation then is conducted using an argon hydrogen forming gas above 1500° C. The etching takes place along the dotted lines 13 to provide a precise diameter hole through the substrate 1 to the larger opening 11. Holes as small as a few of the order of 5 microns in diameter are achievable.

The material sapphire has been known for a long time to have properties that are useful in machine bearing applications but openings deep enough for shaft support yet to close enough tolerances has been available primarily only by relatively coarse lapping and grinding operations. In accordance with the invention, a sapphire substrate is now etchable as described in connection with FIG. 1 to produce an opening with sufficient depth for lateral support yet the opening diameter is held to a bearing tolerance fit.

The invention is also applicable to the fabrication of embossed shapes. Referring to FIG. 4, there is an illustration of an embossed shape such as an impact print element. The impact nature of the print operation requires a material for the element that has both hardness for wear accompanied by the ability to be shaped precisely. The refractory materials have the hardness qualities but the ability to form a precise particular shape has not been available heretofore in the art.

In accordance with the invention, the preformed shape member 2 would be the negative of the print element so that the background of the substrate would be etched away leaving the striking element embossed. In FIG. 4 the element is illustrated as having a backing or bulk portion 15 and embossed thereon is the protruding print shape 16 that remains after the etching.

The etching technique of the invention permits fabrication of materials that previously were difficult to use in certain applications. Hard refractory materials, such as sapphire, can be shaped to use as molds with a thin layer of carbon as needed to prevent wetting for certain high temperature metals or for use as dies where wear resistance is important.

Single crystal components, such as turbine blades, may now be shaped and adjusted without abrading or machining operations.

In optical applications, precise grooves can be subsequently filled with a particular index of refraction material for optoelectronic light pipe structures.

What has been described is an approach for precisely fabricating shapes of refractory oxide materials such as spinels and sapphires by the placing of a high melting point preformed shape member in contact with the material to be fabricated and subjecting the combination to a gas containing 15% hydrogen at temperatures in excess of 1500° C. to effect an etching of the area of the oxide material that is in contact with the preformed shape member.

Having thus described my invention, what I claim as new and desire to secure by Letters Patent is:

1. In a process for etching a shape in a refractory oxide material taken from the group of $Al_2O_3$, $SiO_2$, MgO and $Al_2MgO_4$, the improvement comprising:
   placing a preformed pattern of a material taken from the group of titanium, tantalum, zirconium and hafnium having a melting point higher than 1500° C. but less than the melting temperature of said preformed pattern material in contact with said refractory oxide material, and
   heating said refractory oxide and said preform pattern combination to a range of 1500° C. to the melting temperature of said preformed pattern in the presence of a neutral gas containing hydrogen for a time sufficient to effect an erosion of the surface of said refractory oxide material.

2. The improvement of claim 1 including the additional step of further heating said material in the absence of hydrogen for a time sufficient to smooth the eroded portion.

3. The improvement of claim 1 wherein said placing of said preformed pattern is by deposition through a mask.

4. The process of etching in a direction predominantly perpendicular to the surface of a substrate of refractory oxide materials of the sapphire and spinel types comprising in combination the steps of:
   placing a preformed pattern of a material taken from the group of titanium, tantalum, zirconium and hafnium having a melting point higher than 1500° C. but less than the melting temperature of said preformed pattern material in contact with the surface of said refractory oxide material,
   heating said refractory oxide material and said preformed pattern material combination to the range of 1500° C. but less than the melting temperature of said preformed pattern material in the presence of a neutral gas containing hydrogen for a time sufficient to effect an erosion of the surface of said refractory oxide material under said preformed pattern, and
   removing said preformed pattern material.

5. The improvement of claim 4 wherein said step of placing said preformed pattern is performed by deposition through a mask and said step of removal is by etching with an etch that acts on said preformed pattern but does not act on said substrate.

* * * * *